Nov. 12, 1929.    K. E. PEILER    1,735,837
APPARATUS FOR FEEDING MOLTEN GLASS
Filed June 24, 1925    2 Sheets-Sheet 1

Inventor
Karl E. Peiler
by Robert A. Brown
Attorney.

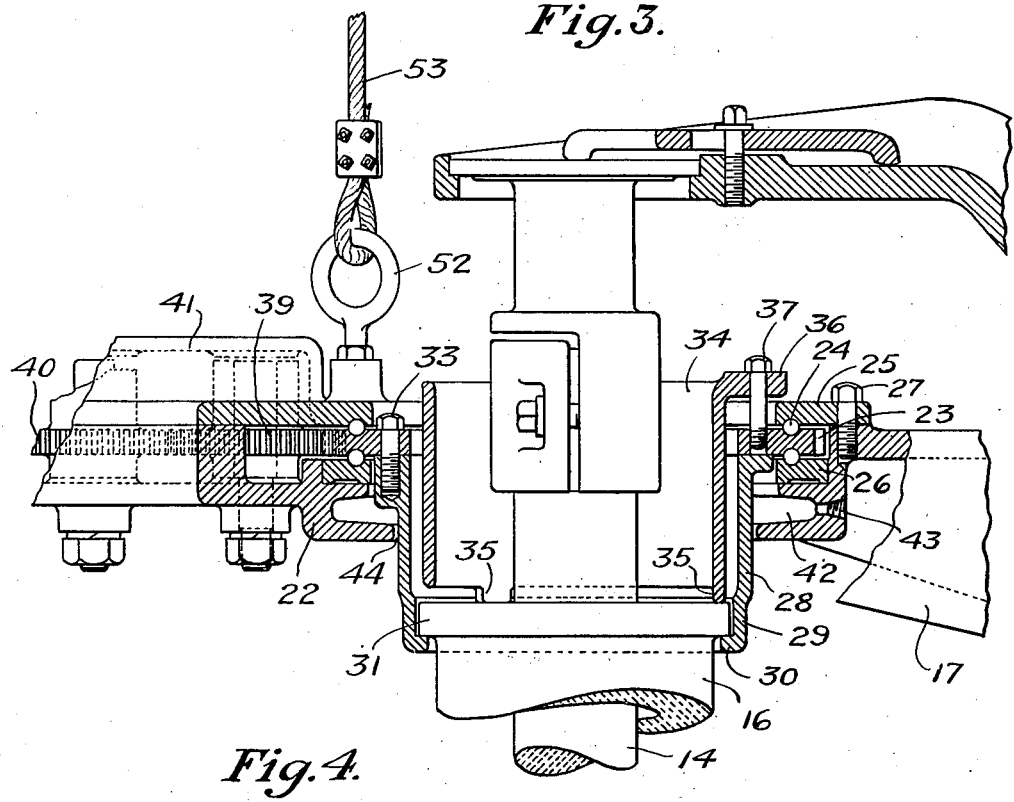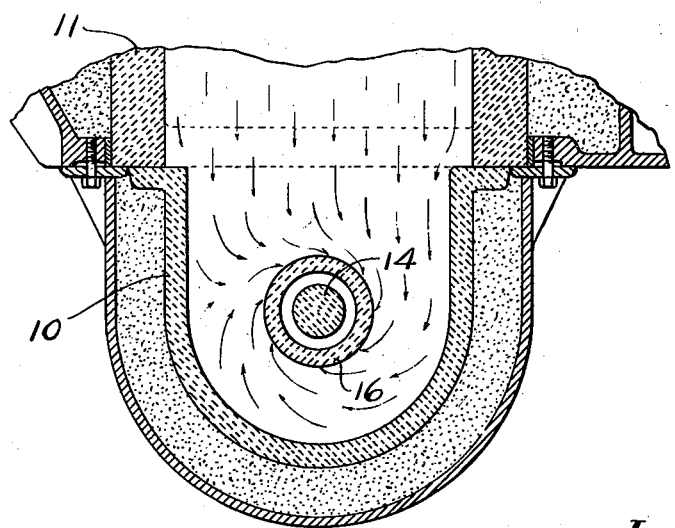

Patented Nov. 12, 1929

1,735,837

UNITED STATES PATENT OFFICE

KARL E. PEILER, OF WEST HARTFORD, CONNECTICUT, ASSIGNOR TO HARTFORD-EMPIRE COMPANY, OF HARTFORD, CONNECTICUT, A CORPORATION OF DELAWARE

APPARATUS FOR FEEDING MOLTEN GLASS

Application filed June 24, 1925. Serial No. 39,242.

My invention relates to apparatus for feeding molten glass from a container to form mold charges, and it relates more particularly to feeders of the type employing an implement for stirring the glass prior to its discharge from the container.

The object of my invention is to improve the construction and operation of stirring apparatus for glass feeders, by providing an arrangement in which the stirring implement shall be rotated independently of any glass-impelling mechanism that may be employed, and in which the stirring implement shall be rotatably mounted in a readily removable bearing provided with means for cooling the bearing sufficiently to withstand the heat to which it is subjected while the feeder is in operation. Rotary stirring implements are useful in certain glass feeders, in order to cause the glass to issue from the discharge outlet of the feeder in a condition of uniform temperature and viscosity. In one such type of feeder, the discharge of the glass from the outlet is regulated by a reciprocating plunger, and the plunger is rotated to give the glass a stirring movement coaxial with the outlet. Another type of feeder employs a plunger enclosed in a vertically adjustable tube which regulates the quantity of glass supplied to the outlet, and the stirring of the glass may be accomplished in such a feeder by rotating the tube. In other types of feeders having rotary stirrers, the rotary implement performs only the function of a stirrer and is independent of the glass delivery mechanism.

In feeders employing rotary stirrer implements of the several kinds mentioned above, the rotation of the stirrer has heretofore been accomplished by mechanism directly connected to the feeder-operating mechanism. In such construction, any change in the speed of operation of the feeder produces a corresponding change in the rotation of the stirrer. Preferably, however, the stirrer should be rotated at a speed which gives the desired circulation and mixing of the glass, and it is desirable to select this speed of stirring independently of the speed of feeder operation and to maintain the speed of the stirrer, notwithstanding changes in the feeder speed. When the stirrer is caused to rotate at an excessive speed, no further advantageous stirring of the glass is accomplished and the stirrer and its mechanism may be damaged by excessive wear which necessitates frequent repair and replacement, not only of the stirrer parts, but also of the glass-containing parts.

According to my present invention, the operation of the stirring implement is controlled independently of the other feeder-operating mechanisms, and the stirring implement, which is specifically illustrated herein as a tube surrounding a feeding plunger, is supported and rotated by means of an improved structure which facilitates its operation, provides protection against heat, and provides for convenient removal and replacement of parts that are subject to wear.

In the accompanying drawings:

Fig. 3 is an enlarged front view of a portion of the apparatus shown in Fig. 1; and Fig. 4 is a horizontal sectional view on line 4—4 of Fig. 1, indicating the action of the glass in the forehearth.

Figure 1:
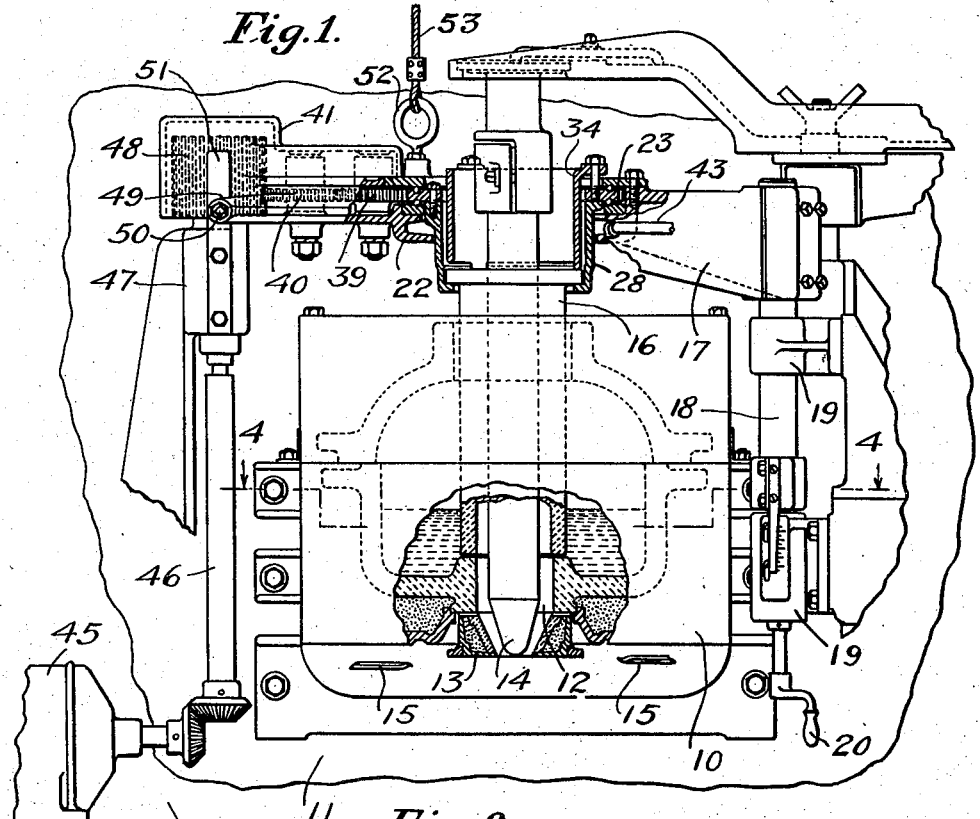
Figure 1 is a front view, in elevation, of a glass feeder embodying my invention, showing parts of the apparatus in section.

Referring to Fig. 1 of the drawing, the numeral 10 indicates a glass container which may be part of a forehearth 11 connected to a furnace for supplying molten glass. The container is provided with an outlet well 12 and an associated outlet ring 13 through which molten glass is discharged to form mold charges under the control of a vertically reciprocating plunger 14, and shear blades 15, 15 that are operated in timed relation with the plunger. A more detailed description of the mechanism for mounting, reciprocating and adjusting the plunger 14, may be had by reference to my copending application for Letters Patent, filed Dec. 31, 1923, Serial No. 683,576.

The plunger 14 is surrounded by a vertically adjustable rotary tube 16 of refractory material, having its lower end projecting into the glass above the outlet 12. This tube is carried by an arm 17 which is adapted to accommodate a tube support and bearing embodying features of the invention hereinafter described.

The positions of the tube and the plunger with respect to the glass container are shown in Fig. 4, in which the arrows indicate the action of the flowing glass under their influence of the rotating tube. The rotation of the tube imparts to the glass a rotary movement which is symmetrical with the discharge outlet and which, therefore, produces the most effective stirring action for giving uniform temperature and viscosity to the discharged masses of glass.

When the tube 16 is lowered, as shown in Fig. 1, it acts as a gate to interrupt the flow of glass to the outlet, and when it is raised, it permits glass to flow to the outlet in an amount controlled by the position to which the tube is adjusted. In order to adjust the tube 16 vertically to thus regulate the amount of glass admitted to the outlet, the arm 17 is mounted for vertical adjustment by any suitable mechanism, as, for example, by a vertical bar 18 which is guided for vertical adjustment in bearings 19, 19 forming a part of the frame mechanism, and adjustment of the bar is effected by a crank 20. The operating mechanism for supporting and adjusting the tube may be, and preferably is, substantially as shown in my copending application above mentioned.

A self-contained bearing structure for the rotary tube 16 is best shown in Fig. 3, and includes an annular housing 22 formed integral with or attached to the arm 17 and having a central opening through which the tube and its bearing members may be removed. The bearing for supporting the tube comprises an annular gear 23 which is supported for rotation between ball bearings 24 contained in a raceway composed of removable upper and lower annular retainer plates 25 and 26 respectively. The lower plate 26 fits into a seat on the housing 22 and the upper plate is secured to the upper portion of the housing by tap bolts 27 and is also adapted to form a cover plate for the bearing.

The tube 16 is secured to the gear 23 by means of a hollow cylindrical clamping member 28 provided at its lower extremity with a reduced portion 29 which terminates in an inwardly extending flange 30 that supports the tube 16 by engagement with a flange 31 provided thereon. The upper portion of the member 28 is secured to the lower side of the gear 23 by means of tap bolts 33.

The tube is clamped for rotation with the gear 23 by the cylindrical member 28 and a cooperating cylindrical clamping member 34 extending within the member 28. The lower extremity of the inner member 34 terminates in projections 35 which engage the top of the tube flange 31. The top portion of the inner cylinder 34 is flanged outwardly, and is formed into a plurality of spaced retainer lugs 36 that are arranged to cooperate with tap bolts 37 to secure the cylindrical clamping member 34 to the upper side of the gear 23. The lugs 36 on the clamping member 34 are provided with slotted openings 38 to form a bayonet joint which permits the member 34 to be released from the tap bolts and from the gear 23 by a twisting motion. This bayonet joint construction provides a ready means for releasing and removing the tube from its support without disturbing any of the adjustments of the tube-operating mechanism.

Figure 2:
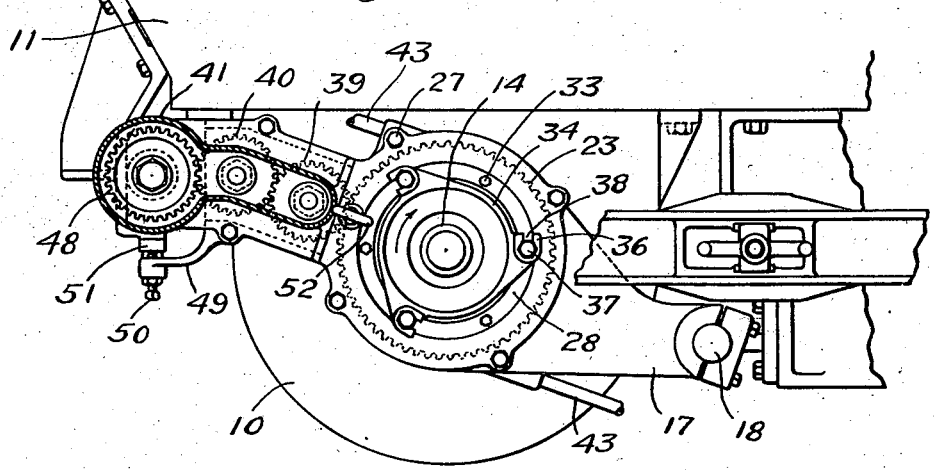
Fig. 2 is a plan view of the apparatus shown in Fig. 1, with parts removed for clearness of illustration.

For the purpose of rotating the tube 16, the gear 23 is driven through interconnecting idle gears 39, 40 which are mounted on an extension of the arm 17. These idle gears are enclosed by a suitable housing 41 which is also carried by the supporting arm 17. As shown herein, power for rotating the tube is supplied by an independently operated motor 45 which is geared to an operating shaft 46, mounted in a bearing 47 which may form a part of the feeder frame or casing 11. The shaft 46 carries at its upper end a gear 48 which is enclosed in the housing 41 and is adapted to mesh with the idle gear 40. The face of the gear 48 is vertically elongated sufficiently to permit the desired relative vertical movement between the stationary gear 41 and the idle gear 40 which is moved vertically with the arm 17 whenever the tube 16 is adjusted up or down. The driving gear 48 and the idle gear 40 are maintained in mesh by means of an extension 49, provided on the extremity of the arm 17, Fig. 2. The extension 49 is provided with an adjusting bolt 50 which is adapted to engage a guide 51 mounted on the shaft bearing 47. This arrangement takes up the drive thrust reaction of the gearing and permits the tube 16 and its gears 23, 39 and 40 to be adjusted readily up or down while the tube is rotating.

The apparatus above described for supporting and rotating the tube is carried by the vertical bar 18, and in order to relieve the strain upon this bar and to facilitate the vertical adjustment of the tube, an eye bolt 52 is attached at a convenient location on the arm 17 and is connected by a cable 53 to a suitable counterbalance mechanism, not shown.

A stirrer projecting into the glass in a feeder forehearth must necessarily extend through an opening in the forehearth cover which is somewhat larger than the stirrer. This leaves a space around the stirrer through which heat from the interior may radiate and through which hot gases or flame may escape, sometimes with considerable force. To minimize the effect of this heat on the tube supports and mechanism and, particularly, on the bearings which support the tube for rotation, the parts supporting the tube are so proportioned as to bring the bearings and mechanism at a considerable distance above the end of the tube and a heat shield and cooling means are interposed between the forehearth opening and the bearings. The cylindrical clamping members 28 and 34 are of such diameter and depth as to space the tube bearings substantially above the zone of intense heat. In addition, the lower portion of the housing 22 is arranged to form an annular chamber 42 into which suitable cooling fluid, preferably air, may be introduced through inlets 43. These inlets are preferably arranged tangentially as shown, so as to give the cooling air a swirling motion in the chamber 42 and distribute the cooling effect. The chamber 42 provides a cooling zone which not only acts as a heat shield but also has a cooling influence on the adjacent parts and distributes cooling air to the bearing parts and to the outer clamping cylinder 28. A large part of this cooling air escapes through the annular opening 44 and flows downwardly along the clamping cylinder 28, forming an annular jet. This annular jet may be given sufficient force by properly regulating the supply through the inlets 43 so as to blow against the annular opening in the forehearth cover around the stirrer, thus opposing the issue of hot gas and flame and so further protecting the tube bearings and mechanism from the heat.

In the normal operation of a glass feeder, it is desirable to deliver glass of uniform temperature, composition and viscosity to the outlet, so as to form homogeneous mold charges. The glass in passing from the furnace toward the feeder outlet tends to flow more rapidly at the center of its flow channel than at the outer edges thereof. Moreover, the outer edges and bottom are generally relatively cooler. Thus the glass tends to approach the outlet with a hotter core partially surrounded or bordered by a colder sheath. In addition to this, cold glass tends to collect in the discharge chamber immediately in front of the discharge outlet and form a pocket of dead or partially devitrified glass. The result is that the glass tends to issue from the outlet with different portions having a different temperature and viscosity, which tends to produce imperfect ware. Sometimes these effects are such that the resulting mold charges and ware made therefrom are "cordy", that is, have optical streaks. The effect of these tendencies may be minimized by uniformly stirring the glass symmetrically with the outlet just prior to its discharge through the outlet. The stirring sets up a circulation around the outlet which avoids or minimizes the collection of viscous or dead glass in the front of the discharge chamber and the stirring also mixes and blends different portions of the glass as they flow toward the outlet. This is accomplished in the present apparatus by rotating the tube 16 at a uniform speed so selected, with due regard to the temperature of the glass, as to stir the glass sufficiently to bring it to a state of uniform viscosity. Owing to the erosive action of the glass on the stirrer and the feeder parts, it is desirable to rotate the stirrer at the slowest speed which will produce the required stirring effect. Excessive speed of the stirrer produces only deleterious effects on the feeder parts and on the stirrer mechanism. It is, therefore, an important advantage of my present arrangement that the rotation of the tube and the regulation of its speed are independent of the plunger operating mechanism. This feature is shown in my copending application for Letters Patent, filed April 30, 1925, Serial No. 26,887.

Another important advantage of the construction herein shown and described is that the plunger and the tube may be removed readily and without disturbing the connections for driving the tube. Since the bearings are subject to considerable wear, even when the bearings are kept relatively cool by the means described above, it is frequently necessary to replace these elements. This is readily accomplished by removing the retainer plate 25 which permits the removal of the tube and its holding mechanisms as a unit. Thus the tube may be removed from the bearing support without disturbing the bearing elements, or the tube and bearing support may be removed without detaching the tube from its bearing support or disturbing the adjustments of any of the operating mechanisms.

While I have shown and described a preferred embodiment of the invention, it will be understood that various changes may be made therein without departing from the spirit of the invention as expressed in the appended claims.

I claim:

1. Apparatus for feeding molten glass, comprising a container having a discharge outlet, a rotary implement extending into the glass in said container, a bearing supporting said implement, and means for directing cooling fluid adjacent to said bearing.

2. Apparatus for feeding molten glass, comprising a container having a discharge outlet, a vertical plunger mounted for reciprocation above said outlet, a rotary tubular member surrounding said plunger and having its lower end extending into the glass in said container, a bearing for rotatably supporting said tubular member, and means for directing cooling fluid adjacent to said bearing.

3. Apparatus for feeding molten glass, comprising container having a discharge outlet, a rotary implement projecting into the glass in said container, a support for the said implement including a bearing mechanism for said implement, and means for directing a cooling fluid around said bearing mechanism.

4. Apparatus for feeding molten glass, comprising a container having a discharge outlet, a rotary implement projecting into the glass in said container, a rotatable support for said implement, a bearing carrying said support, a housing adjacent to said bearing, and means for projecting cooling air into said housing.

5. Apparatus for feeding molten glass, comprising a container having a discharge outlet, a rotary implement projecting into the glass in said container, a support for said implement and its operating mechanism including a housing, implement rotating mechanism mounted in the housing, and means associated with the housing for directing cooling fluid around the implement operating mechanism.

6. Apparatus for feeding molten glass, comprising a container for the glass having a discharge outlet, a plunger mounted for vertical reciprocation above said outlet, a tube surrounding said plunger and having its lower end immersed in the glass in said container, a bearing for supporting and rotating said tube, means for connecting said bearing and said tube and for spacing said bearing substantially above said tube, and means for directing cooling fluid adjacent to said spacing means and said bearing.

7. Apparatus for feeding molten glass, comprising a container having a discharge outlet, a rotary implement extending into the glass in said container, and mechanism for supporting and rotating said implement, comprising a rotatable annular support, a bearing therefor, and a holder for said implement comprising clamp members carried by said rotatable support, one of said clamp members being removable from said support to enable said implement to be removed upwardly from said holder through said annular support.

8. Apparatus for feeding molten glass, comprising a container having a discharge outlet, a rotary implement extending into the glass in said container, and mechanism for supporting and rotating said implement, comprising a rotatable annular support, a bearing therefor, and a holder for said implement comprising clamp members secured to said rotatable support from above and from below respectively, the clamp member that is attached to said support from above being removable to permit said implement to be removed upwardly through said support and through said bearing.

9. Apparatus for feeding molten glass, comprising a container having a discharge outlet, a rotary implement extending into the glass in said container, and mechanism for supporting and rotating said implement, comprising a rotatable annular support, a bearing therefor, and a holder for said implement comprising two concentric annular members, the adjacent portions of said members at one end thereof being arranged to engage said implement, and the other ends of said members being secured to said rotatable support, the inner annular member of said holder being removable to permit said implement to be removed from the other member of said holder.

10. Apparatus for feeding molten glass, comprising a container having a discharge outlet, a rotary implement projecting into the glass in said container, and means for supporting and operating said implement, including a raceway containing anti-friction bearing elements, a rotary annular supporting member resting upon said bearing elements, other anti-friction bearing elements above said supporting member for preventing said supporting member from rising with respect to said lower raceway, and clamping means connecting said implement with said rotary annular supporting member and including a member removable to permit upward movement of the implement through said rotary annular supporting member.

11. Apparatus for feeding molten glass, comprising a container having an outlet, a plunger mounted for reciprocation above said outlet, a rotary tube surrounding said plunger, a vertically adjustable support for said tube, a rotary bearing member mounted on said support and connected with said tube, removable bearing elements disposed above and below said bearing member and normally preventing axial movement of said bearing member and said tube relatively to said support, and means for releasing said tube to permit upward movement thereof through said rotary bearing member.

12. Apparatus for delivering molten glass from a container having an outlet comprising a rotary stirring implement projecting into the glass in the container, a clamp detachably secured to the upper end of said implement, a gear detachably secured to said clamp, a support, removable bearing means interposed between the said support and the said gear, and means for directing a cooling fluid to said bearing means.

13. Apparatus for feeding molten glass, comprising a container having a downwardly opening discharge outlet, a vertical plunger mounted for vertical reciprocation above said outlet to control the discharge of glass therefrom, a vertically adjustable rotary tube surrounding said plunger and having its lower end immersed in the glass in said container, and means for supporting and rotating said tube comprising a vertically adjustable support, a bearing raceway carried by said support, an annular gear mounted rotatably in said raceway, an outer annular clamping member having its upper end secured to said gear and having its lower end shaped to engage said tube, an inner annular clamping member having its upper end secured to said annular gear by a readily detachable connection and having its lower end adapted to cooperate with the lower end of said outer clamping member to clamp said tube, and gearing for rotating said annular gear.

14. Apparatus for feeding molten glass, comprising a container having a downwardly opening discharge outlet, a vertical plunger mounted for vertical reciprocation above said outlet to control the discharge of glass therefrom, a vertically adjustable rotary tube surrounding said plunger and having its lower end immersed in the glass in said container, means for supporting and rotating said tube comprising a vertically adjustable support, a bearing raceway carried by said support, an annular gear mounted rotatably in said raceway, an outer annular clamping member having its upper end secured to the under side of said annular gear, an inner annular clamping member having its upper end secured by a readily detachable bayonet joint to the upper side of said annular gear, the said clamping members having their lower ends adapted to clamp between them an upper portion of said tube, gearing carried by said support for rotating said annular gear, means for driving said gearing, a housing carried by said support and surrounding said outer clamping member, and means for introducing cooling fluid into said housing and for thereby cooling said raceway, said annular gear and said clamping members.

15. Apparatus for feeding molten glass, comprising a container having a discharge outlet, a tubular rotary implement extending into the glass in said container, an annular bearing, a rotatable holder depending from said bearing for suspending said implement, and means disposed between said bearing and said tubular member for cooling said holder and said bearing.

16. Apparatus for feeding molten glass, comprising a container having a discharge outlet, a tubular rotary implement extending into the glass in said container, an annular bearing, a rotatable holder depending from said bearing for suspending said implement, and means disposed between said bearing and said tubular implement for directing a constrained flow of cooling air upon said holder and upon said bearing.

17. Apparatus for feeding molten glass, comprising a container having a discharge outlet, a tubular rotary implement extending into the glass in said container, an annular bearing, a rotatable holder depending from said bearing for suspending said implement, and means disposed between said bearing and said tubular member for cooling said holder and said bearing, the said cooling means comprising an enclosure surrounding said holder, and means for introducing cooling air tangentially into said enclosure.

18. Apparatus for feeding molten glass, comprising a container having a discharge outlet, a tubular rotary implement extending into the glass in said container, an annular bearing, a rotatable holder depending from said bearing for suspending said implement, and means disposed between said bearing and said tubular implement for shielding said bearing from the zone of intense heat occupied by said implement and for directing cooling air upon said holder and upon said bearing.

19. Apparatus for feeding molten glass, comprising a container having a discharge outlet, a tubular rotary implement extending into the glass in said container, double-thrust bearing means for rotatably supporting said implement and means normally preventing said implement both from upward movement and from downward movement relative to said bearing and including a member removable to permit upward movement of the implement through said bearing means.

20. Apparatus for feeding molten glass, comprising a container having a discharge outlet, a tubular rotary implement extending into the glass in said container, a rotatable annular support for said implement and an annular bearing for said support, the said bearing comprising thrust members disposed above and below said rotatable support, and anti-friction elements disposed between said thrust members and said support, and clamping means connecting said implement with said rotatable annular support and including a member removable to permit upward movement of the implement through said rotatable annular support.

21. Apparatus for feeding molten glass, comprising a container for the glass having a discharge outlet, a plunger mounted for vertical reciprocation in substantially axial alignment with the outlet, a tube surrounding said plunger and having its lower end immersed in the glass in said container, a bearing for supporting and rotating said tube, means for connecting said bearing and said tube, and means for directing cooling fluid adjacent to said connecting means and said bearing.

22. Apparatus for feeding molten glass, comprising a container having a discharge outlet, a rotary implement extending into the glass in said container, and mechanism for supporting and rotating said implement, comprising a rotatable annular support, a bearing therefor, and a holder for said implement comprising two cooperative annular members having adjacent portions arranged to engage said implement and having other portions connected with said rotatable support to cause rotation of the implement with said rotatable support, one of said annular members of said holder being removable to permit said implement to be removed from the other member of said holder.

23. Apparatus for feeding molten glass, comprising a container having a discharge outlet, a tubular rotary implement extending into the glass in said container, an annular bearing, a rotatable holder depending from said bearing for suspending said implement, and means disposed between said bearing and said tubular member for cooling said holder and said bearing, the said cooling means comprising an enclosure surrounding said holder, and means for introducing cooling air into said enclosure.

Signed at Hartford, Conn., this 22nd day of June, 1925.

KARL E. PEILER.